Dec. 18, 1951 — M. E. MARTELLOTTI — 2,578,711
BEARING
Original Filed May 13, 1941 — 2 SHEETS—SHEET 1
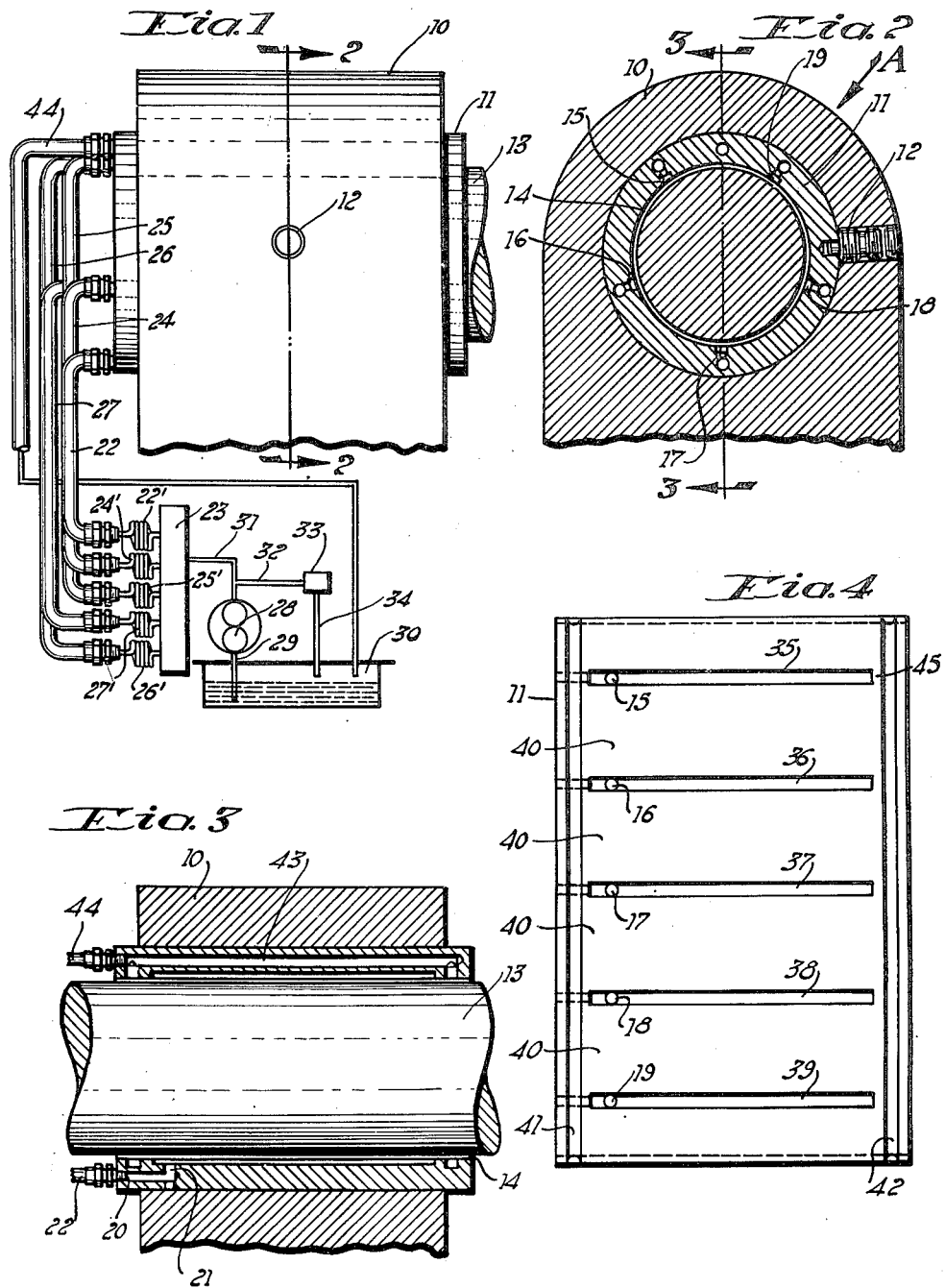
INVENTOR.
MARIO E. MARTELLOTTI
BY Blair, Curtis & Hayward
ATTORNEYS Dec. 18, 1951      M. E. MARTELLOTTI      2,578,711
BEARING
Original Filed May 13, 1941      2 SHEETS—SHEET 2
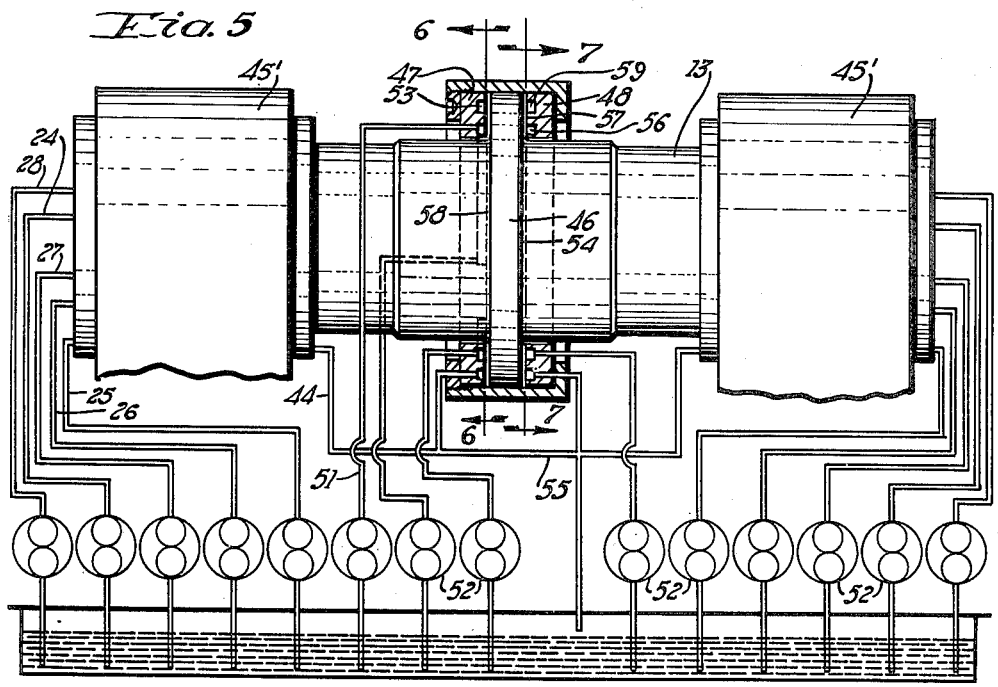
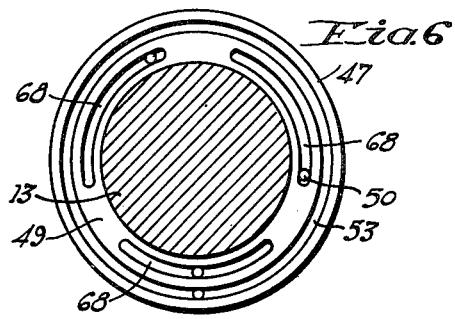
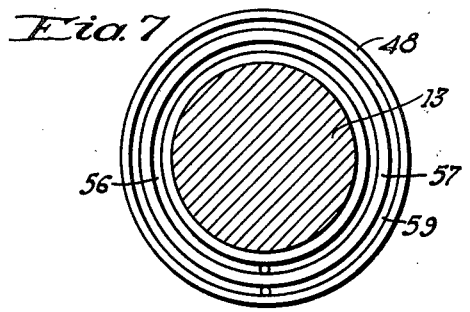
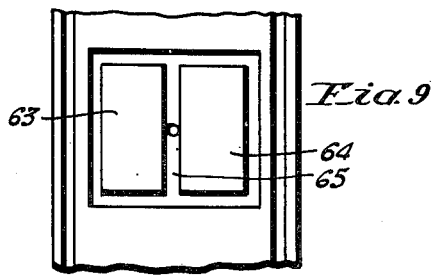
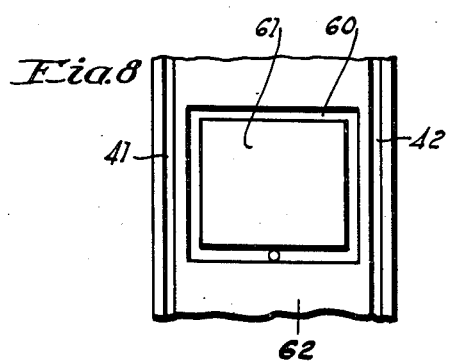
INVENTOR.
MARIO E. MARTELLOTTI
BY Blair, Curtis and Hayward
ATTORNEYS Patented Dec. 18, 1951

2,578,711

UNITED STATES PATENT OFFICE 2,578,711

BEARING

Mario E. Martellotti, Cincinnati, Ohio, assignor to The Cincinnati Milling Machine Company, Cincinnati, Ohio Continuation of application Serial No. 393,212, May 13, 1941. This application June 27, 1947, Serial No. 757,541

5 Claims. (Cl. 308—122)

This invention relates to bearing structures and more particularly to improvements in the construction and operation thereof. This application is a continuation of my co-pending application Serial No. 393,212, filed May 13, 1941, now abandoned.

One of the objects of this invention is to provide an improved bearing which will have the smooth quiet operating characteristics of a plain bearing without the disadvantages inherent in such bearings.

Another object of this invention is to provide an improved bearing in which a journal may be supported by a film of lubricant under pressure with sufficient rigidity to prevent any appreciable eccentric shifting of the journal during rotation of the journal.

A further object of this invention is to provide a bearing having a support carrying a pressure film of lubricant, the pressure of which will be automatically intensified in opposition to unbalanced radial loads at any circumferential point to arrest lateral shifting of the journal in its incipiency.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a view in elevation of a bearing showing the lubricant supply connections thereto.

Figure 2 is a sectional view of the bearing as on the line 2—2 of Figure 1.

Figure 3 is a section through the bearing as viewed on the line 3—3 of Figure 2.

Figure 4 is an expanded view of the inner face of the bearing sleeve or circumscribing support for the shaft or journal.

Figure 5 is a view of a combination radial and thrust bearing diagrammatically indicating the employment of the individual lubricant supply lines.

Figure 6 is a sectional view as on line 6—6 of Figure 5.

Figure 7 is a similar view on the line 7—7 of Figure 5.

Figure 8 is a fragmentary view of an alternative form of grooving to that shown in Figure 4, and Figure 9 is a similar view of another modification thereof.

Bearings of various forms are utilized in all types of mechanical systems and mechanisms. The efficiency of such bearings depends upon their ability to support the load imposed and to facilitate actuation of the supported element with a minimum of power loss.

In many cases bearings are utilized to support a machine part in precision relationship to another part, in which case any fluctuations in the relative position of the associated elements may have a detrimental effect on the precision of the machine.

If a liquid, utilized as a lubricant, wets the opposing surfaces of a bearing and the surfaces are separated during relative movement by a film of the liquid, the friction developed between the relatively moving layers of the liquid is known as fluid friction. With the proper choice of materials having the necessary characteristics, a fluid friction factor can be obtained which is lower than the coefficient of friction factor obtainable with any other means. Thus, by reducing all the friction in a bearing to fluid friction a most efficient bearing can be obtained.

Another phenomena in connection with the use of lubricant in bearings is that if the lubricant is caused to flow between converging surfaces, shear of the fluid occurs which develops a pressure therein and this pressure reaches a maximum at the point of minimum distance between the converging surfaces. Advantage has been taken of this fact in bearings by the use of tiltable pads or shoes but since such constructions require a number of parts and considerable space they are more expensive to manufacture than plain bearings.

Furthermore, the pressure of the supporting lubricant film developed by shear of the lubricant depends upon a certain speed of relative movement between the bearing parts which renders this shear pressure unsatisfactory at low speeds of bearing operation. When movement stops there is an eccentric displacement of the journal with respect to the bearing due to loss of the lubricant film. This increases the starting friction and necessitates considerable effort if the journal has to be rotated manually as is sometimes necessary in certain machines.

This invention deals with a bearing in which a fluid film encircling the journal is maintained at all times under sufficient pressure in a manner to support the dead load of the parts without metal to metal contact and regardless of whether the parts are at rest or in motion whereby the only friction during motion is the fluid friction of the lubricant.

This manner of supporting the journal to reduce the friction introduces a supplemental problem because a fluid film is deformable if it constitutes one body of fluid and free flow exists throughout the body of fluid. It is a well-known physical law that an object contained in a vessel of fluid under pressure is free to move about in the vessel regardless of the pressure if free flow exists therein because the pressures on all sides of the object are never out of balance. Thus, the mere fact that a body of fluid is under pressure, does not prevent free movement of an object through the fluid. It, therefore, becomes necessary to prevent free flow within the fluid in order to establish forces which not only balance one another but which are effected in value by any movement of the object.

It is also axiomatic that the pressure of a flowing liquid, as in a channel, depends upon the resistance to flow of the liquid. With suitable pumping means delivering fluid to a channel, a throttle valve may be utilized to resist the flow of liquid and thereby create a pressure therein. Thus, any pressure desirable may be obtained by simply adjusting the throttle valve. After establishment of a given pressure, it will be obvious that the pressure may be increased or decreased by increasing or decreasing the resistance of the throttle valve.

Use is made of these laws to control the fluid film in the bearing. First, free flow of the lubricant from one part of the film to another is restricted. Secondly, means are provided whereby the pressure in one part of the film may be raised or lowered with respect to the pressures in other parts of the film in accordance with the magnitude of an applied load to produce a balancing force opposing the applied load and thus maintain the journal in equilibrium.

These results can be obtained simultaneously by providing a series of longitudinally extending grooves around the bearing and independently supplying each groove with lubricant under pressure. This will result in lands intervening each groove, and by making the clearance space between the lands and the journal of the proper size, these clearance spaces may be caused to act as throttles to control the resistance to leakage from the grooves and thereby establish a given operating pressure therein. Should the journal shift in any direction to decrease this clearance, an automatic throttling action on the leakage from one or more grooves facing the force will occur which will raise the pressure in these grooves with the reverse effect occurring accompanied by a decrease in pressure in the opposite grooves thereby creating an equalizing effect which will not only prevent further movement but act to restore the journal to a substantially constant running position.

It will be obvious that if a large number of such grooves of small width were provided that the surface of the journal shifting toward any groove could be considered as a flat surface and thus act as a flat cover to completely close or cap the groove. This would shut off the flow from the groove and would cause a fast rise in pressure. This would provide the most efficient and sensitive operation. For ordinary commercial utilization, however, it is found necessary to provide only a few grooves and to utilize only one pump as a suitable source for supply of pressure feed of lubricant to the grooves, means being provided whereby the supply to each groove is rendered substantially independent, so that no feed backs occur between the supply lines. The lands between the grooves serve as throttling means for the grooves and also act to prevent free flow throughout the body of the film, whereby differential pressures may be created therein. In practice the circumferential dimension of the land areas is at least twice that of the grooves as can be seen in Figure 4. By making the grooves narrow the end leakage therefrom is negligible, and substantially all the fluid from the grooves flows over the relatively large land areas between the grooves thus making full use of the lubricant as a shock resisting medium.

A simplified form of the invention is shown in Figures 1 to 4 of the drawings in which the reference numeral 10 indicates the housing of a bearing in which is tightly fitted the bearing sleeve 11. The sleeve may be secured in the housing by a lock screw 12 as indicated in Figure 2 of the drawings. The reference numeral 13 indicates the journal portion of a member which is adapted to be rotatably supported by the bearing.

In accordance with this invention the diameter of the interior bore of the sleeve 11 and the diameter of the journal 13 are made sufficiently different in size to provide a small clearance space 14 between the journal and the sleeve in which to develop a film of lubricant under pressure for supporting the journal in spaced relation to the interior wall of the sleeve whereby no metal to metal contact occurs and the only friction is the fluid friction developed in the lubricant.

The radial depth of the clearance space must be made such that a film of lubricant can be created therein without attenuation or breakdown, taking into consideration the viscosity of the lubricant, but still the space must not be so large as to permit excessive leakage of the lubricant.

The radial dimension of this space is comparable to the clearance space provided in running fits which are well known and understood by those skilled in this art. Such fits, of course, vary in accordance with the diameter of the parts and with the viscosity of lubricant utilized.

In order to prevent attenuation of the fluid film and for other reasons to be made apparent hereafter the lubricant is supplied to the bearing at a plurality of circumferentially spaced points, the number of which would vary with the size of the bearing. For explanatory purposes five points of supply have been illustrated in the drawings and comprising the outlets 15, 16, 17, 18 and 19. One of these outlets is illustrated in Figure 3 from which it will be apparent that a longitudinally extending bore 20 is formed in the end of the sleeve and intersecting a radial bore 21 which communicates with the interior of the bore of the sleeve.

The bore or passageway 20 is connected by an independently restricted channel 22 to a distributor head 23. As shown in Figure 1, other channels 24 and 25 connect the outlets 18 and 19 to the distributor head and channels 26 and 27 connect the outlets 15 and 16 to the distributor head. The distributor head is supplied with lubricant under pressure by a pump 28 which has an intake 29 through which fluid is withdrawn from a suitable reservoir 30 and a delivery channel 31 which is connected to the distributor head. The delivery channel 31 has a branch connection 32 to a relief valve 33 which has an exhaust pipe 34 for returning excess lubricant to the reservoir. The lubricant employed is preferably a machine oil of the type usually employed for the lubrication of bearings or the like.

Attention is invited to the fact that the channels 22, 24, 25, 26 and 27 are all independently restricted channels in the sense that they form a definite resistance to the flow of fluid and thereby create a pressure drop between the distributor head and the outlet in the bearing.

This resistance may be obtained in many ways, as by providing coils of fine tubing 22', 24', 25', 26' and 27' in the respective channels; inserting a throttle valve in each channel; or merely by sufficient length of tubing such as would occur if the header were located some distance from the bearing as in a remote part of a machine. The purpose of this resistance is to render more uniform the flow of lubricant in each of these channels and prevent a sudden high or low pressure at the bearing outlet of one channel from being fed back to the distributor head and then out through other channels to other parts of the bearing. These resistances tend to render the pressure in one part of the bearing independent of the pressure in any other part thereof for all practical purposes.

In order to facilitate the formation of the lubricant film completely surrounding the journal, provision is made in association with each outlet for free flow of the lubricant to a limited extent to establish an initial pressure area and distributing point for supplying the lubricant for the formation of the film.

One manner of doing this is illustrated in Figure 4 of the drawings in which the sleeve 11 is shown rolled out or expanded to expose the wall of the interior bore of the sleeve. As there shown, the outlets 15 to 19 inclusive terminate in longitudinally extending grooves 35 to 39 inclusive. Thus, the interior surface of the sleeve is broken up into a series of grooves or depressions designated by the numerals 35 to 39 inclusive and intervening land areas 40. The radial depth of the space between the surface of the lands 40 and the surface of the journal is the same as the clearance space 14 indicated in Figure 2 and this dimension, being small creates a resistance or restriction to the flow of lubricant over the land areas. Therefore, the depressions constitute areas for the free flow of lubricant, while the land areas constitute means to restrict the flow of fluid, but sufficient pressure is developed in the lubricant in the depressions to force the lubricant through the land areas. Because the circumferential dimension of the land areas is at least twice that of each of the grooves, there is provided a high shock resistant characteristic in the bearing. Thus each depression or groove is a part of the following substantially independent hydraulic circuit: the source of fluid under pressure (the distributor head 23), a hydraulic resistance (resistance 22', for example) to the fluid flowing into the depression or groove (sometimes known as "in" resistance), the depression or groove and a hydraulic resistance (the land areas 40 on both circumferential sides of the depression or groove) to the fluid flowing out of the depression (sometimes known as "out" resistance). In such a circuit by making the "in" resistance equal to the "out" resistance the pressure in the depression or groove (between the resistances) is one half of the pressure at the source (head 23). Of course, if desired, a different groove pressure can be predetermined by making the "in" resistance greater or smaller than the "out" resistance. The result in any case is an intermediate pressure in the grooves which is capable of being increased automatically in any groove by an increase in the value of the "out" resistance from that groove caused by a force applied to the journal generally toward such groove. This increased pressure in the groove and in the film on the adjacent land area will counteract such force. Hydraulic resistance however depends upon the viscosity of the lubricant employed; more specifically the resistance is proportional to the viscosity of the lubricant divided by the cube of the cross-sectional height of the passage comprising the resistance. Accordingly given a lubricant having a certain viscosity and a certain clearance between the sleeve 11 and journal 13, the relief valve 33 may be so adjusted as to create the desired pressure in the grooves 35—39 and a gradient pressure in the film on the adjacent land areas 40 not only to support the journal in static or dead load condition but also to withstand any loads encountered in use without attenuation or breakdown of the film. Since there is leakage from the annular space or clearance 14 which in the illustrated form of the invention would occur at the ends of the bearing, there is a constant urge for the lubricant as it spreads out on either side of a depression, such as 36, to tend to work both circumferentially and toward one end or the other of the bearing creating a pressure gradient over the land areas which terminates in atmospheric pressure at the ends of the bearing. Therefore, each depression creates a pressure area which forces the lubricant to spread out in all directions over the adjacent land areas and meet the lubricant distributed by the adjacent pressure areas at some intermediate point in the connecting land area. Accordingly on a circumferential line of the sleeve 11 intersecting the depressions or grooves 35—39 there are peaks of high pressure at the grooves or depressions graduating to low pressure points substantially midway therebetween. Thus these low pressure points are the boundaries of the land areas whose film pressures are controlled or under the influence of each particular groove or depression. Therefore the bearing is effectually divided into a continuous series of independent pressure-film areas and the pressure of one area may vary substantially according to load conditions without substantial pressure reflection from it to other areas.

The combined effect is the establishment of a film which completely surrounds the journal and supports it out of metal to metal contact with the sleeve. It will be noted that the land areas because of their large area in comparison with the area of the grooves (Figure 4) prevent free circumferential flow of the lubricant around the journal and that they also act to restrict the leakage from the bearing to a prescribed amount. The thin film of lubricant on the large land areas is able to withstand great shocks such as those encountered where the bearing is used to rotatably support a multi-toothed cutter on a milling machine or the like.

It should now be obvious that by preventing free circumferential flow, each pressure area may act independently to a certain extent from the others and is thus enabled when the journal is shifted laterally by a suddenly applied unbalanced load to intensify automatically its pressure to oppose said load.

Attention is invited to the fact that with the structure illustrated in Figure 3, for example, there has been provided a bearing structure comprising an outer supporting member having an internal cylindrical bore to receive the shaft or other member which is intended to be freely movable or rotatable with respect to the support and in which the customary running fit or clearance is provided between the parts to receive an intervening film of lubricant which in the present instance is maintained under pressure insuring complete filling of the space, together with a gradual change of lubricant to prevent overheating or breaking down of the lubricant film.

To this extent the bearing structure as an entirety operates so that a lubricant thin film over the relatively large land areas (Figure 4) is provided entirely circumscribing the shaft or supported member and preventing metal to metal contact of the parts, as well as providing in the bearing a high shock resisting characteristic. In conventional bearing structures of this character, however, as load is applied in any direction against the supported member it tends to decentralize this member or shift the axis thereof in the direction of load displacement, squeezing the film at one side of the bearing which is counteracted to a limited degree only by the pressure wedge created by rotation of the shaft and the shear forces in the oil film tending to limit the shaft movement and prevent deleterious metal to metal engagement. The present structure, however, embodies the additional highly improved feature that displacement of the shaft or supported part in any direction, by a load applied, as for example, in the direction indicated by the arrow A in Figure 2, will tend to restrict the discharge of lubricant under pressure from grooves 16 and 17 while facilitating its discharge from groove 19.

As a result the restriction of flow from the portings 16 and 17 and connected grooves 36 and 37 will cause a building up of pressure not only in the grooves but in the land areas 40 intervening and adjacent these grooves. This increased pressure expands circumferentially and longitudinally from grooves 36 and 37 to create a lubricant film in this area of increased pressure in opposition to the force indicated by the arrow A.

At the same time the lessening of resistance to flow from the port 19 and its connected groove 39 will diminish the pressure therein and in the land areas 40 adjacent thereto. This decreases pressure against the shaft in the direction of the applied force. Like pressure diminution of smaller magnitude will occur at ports 15 and 18, and connected grooves 35 and 38 and the land areas 40 adjacent thereto. These pressure differentials will, therefore, resist movement of the shaft under load applied in the direction of the arrow A tending to maintain its centralized position and insuring existence of an adequate lubricating film without depending on the creation of a pressure wedge by shear in the oil film. It will be obvious that a similar variation in lubricant pressure will occur at the proper points in the bearings to counteract a force applied to the shaft in any direction. As a result there will be a minimum of frictional loss as well as of radial displacement of the shaft or supported member and an extremely free running structure will be provided in which the axis of rotation of the shaft 16 will be properly centralized. The structure will therefore be particularly effective for employment in grinding machines or other machinery where maintenance of the radial position of a shaft or the like is of ultimate importance for production of highly accurate work.

Because the pump may run continuously the journal may be supported on a lubricant film under static or dead load conditions in substantially the same radial position as when running, thus insuring a low starting torque. During rotation, however a shear of the fluid in the clearance 14 will take place to generate a certain additional dynamic pressure which will greatly increase upon any eccentric or lateral movement of the journal caused by a force applied thereto in any direction because of the wedge effect on the side of the bearing facing the direction of the force. This will act to supplement the counteracting pressure conditions set up in the manner described above.

It will be understood that the reactions just described are most effective when there is a continuous though limited flow of lubricant from, as well as into, the bearing since the creation of pressure differentials is dependent on existence of a flow condition. It is, therefore, desirable that one of the elements, that is, either the supporting element 11 or the supported element 13 be provided with collecting pockets, grooves or ports, as for example, the grooves 41 and 42 particularly illustrated in Figure 4 which are, in turn, connected to reservoir 30 as by the conduit 44.

While the shaft 13 is contained in a unitary chamber with which it has a running fit and is completely surrounded in this chamber by a continuous film of lubricating medium, a radial displacement of the shaft 13 by a force in any given direction will increase the resistance to flow of lubricating medium toward the adjacent low pressure collection points facing the direction of shaft movement and decrease the resistance to flow at diametrically opposite points, thus creating oppositely disposed high and low pressure regions resisting the displacing force. The clearance space between shaft 13 and its support is so slight as to prevent free circumferential transfer of fluid or pressure conditions from the high to the low pressure regions. As a result the bearing automatically effects pressure differentials in the areas adjacent the respective input ports. These pressure differentials result from the most minute radial displacements of the supported member and tend to resist a load applied in any direction. Any appreciable displacements of the shaft under load conditions is prevented to insure adequate satisfactory maintenance of the intervening lubricating film for free frictionless rotation or movement of the shaft in its supporting element.

While the drawings show a substantially symmetrical arrangement of the pressure ports, particularly desirable when the contemplated load application may vary in direction from time to time, if desired these may be non-symmetrically located as by placing additional or more closely spaced discharge ports in a sector where its known maximum displacement resistance will be required.

It will further be understood that while the several grooves, portings and the like have been shown as formed entirely in the supporting member 11 that this particular location has been chosen merely for purposes of illustration as the collecting or other grooves could be formed in the shaft or rotating element 13 itself, in end plates or caps for the bearing, or other suitable locations without in any wise departing from the spirit of the present invention.

In Figure 5 of the drawings there has been shown a combined radial and thrust bearing structure in which use is made of the bearing members 45' for absorbing radial thrust which may be of the character indicated in connection with Figure 2 for example, while the shaft mounted in these bearings is provided with the disc 46 having bearing surfaces 54 and 58 intermediate the suitably supported members 47 and 48. These members are shown in detail respectively in Figures 6 and 7. It will be noted that the member 47 has a plurality of arcuate grooves or recesses 68 in the general bearing face 49, each of which is interdrilled as at 50 to provide a passage connecting the groove with a pressure lubricant supply line such as 51. In this connection it will be noted that as an alternative to the employment of a single pressure member with a distributor head and a mulplicity of resistances, use has been indicated of a number of gear or like pumps 52 which may be individual to each pressure connection desired in the bearing and may be nested on a single drive shaft to insure completely independent creation of pressure in each effective recess and prevent any feed back or interconnection between the pressure lines of the respective recesses. There is additionally provided in the member 47 the collecting groove 53 by which the extruded lubricating medium forced between the bearing surfaces 49 and 58 by way of the recesses 68 may be returned as through conduits 55 to reservoir.

As distinguished from the member 47, the member 48 has but a single continuous pressure groove 56 in its bearing surface 57 which cooperates with the surface 58 of member 46 and has the collection channel 59 coupleable with the return 55.

In this form of invention, due to the differential in pressure areas 68 and 56, a differential will normally exist urging the disc 46 to the left, thus stabilizing the bearing and tending to eliminate any hunting action, a result alternatively effectable by varying the pressure components to the respective members or the effective areas of corresponding opposed grooves receiving the same unit pressures.

The structure just described is particularly advantageous when employed in connection with conventional grinding machines, where for adjustment purposes the thrust bearing as an entirety is pivotally mounted in gimbal bearings, as shown for example in U. S. Patent 2,178,850. The members 47 and 48 are secured together as a unit and the pressures in the multiple recesses 68 jointly react to stabilize the pivoted or floating thrust bearing and prevent any tilting or cramping with respect to the contained disc 46.

As in the forms previously described, however, any additional thrust action tending to displace the relative positions of the member 46 and support parts 47, 48 either axially or angularly will increase the pressure in the recess or recesses in one of these members by diminution of their separation and consequent increase in resistance to flow of fluid to the respective collection channels and at the same time diminish the pressure in the opposed member or groove by increase in the relative separation so that this type of bearing also tends automatically to stabilize itself to minimize relative movement of the parts under load and at the same time insure maintenance of an intervening lubricant film between the bearing surfaces required for free frictionless operation.

It will, of course, be understood that the structures illustrated in elevation in Figures 6 and 7 could alternatively be formed on the surfaces 54 and 58 respectively of the disc 46 in place of being formed in the members 47 and 48 without changing the principles or effectiveness of operation of the present invention and without in any wise departing from the spirit of the invention. This capacity for interchange of the position of the recesses or grooves of Figure 2 to the shaft in place of the bushing is equally possible, in which event it is merely necessary to provide suitable pressure and collecting grooves in the outer member to supply the pressure operating medium to intervene the opposed bearing surfaces.

It will likewise be understood that while the invention has been primarily illustrated for utilization in connection with rotary bearing members that the expanded view of Figure 4 could alternatively be considered as a flat way on a machine slide or the like intended to cooperate with a similar way on either a slide or support so long as two suitable interfitting bearing surfaces are provided, designed to be separated for free relative movement by an interposed film of oil. When so constructed the sliding action due to pressure injection of the lubricant to the opposed surfaces by way of the grooves or recesses would prove extremely free and creation of pressure urging the surfaces toward each other would as in the forms previously described merely cause a building up of pressure adjacent the loaded recesses so that proper lubricating film would still be maintained.

In Figure 8 there has been shown a slightly modified form of the expanded bearing structure of Figure 4 in that grooves 60 corresponding in purpose to grooves such as 35 of Figure 4 have been shown rectangular in place of merely lineal form, thus providing an inner bearing surface or island 61 surrounded by the pressure groove so that the lubricant under pressure will expand toward the center from all sides, as well as outwardly along the plane surface 62, it being understood that a suitable number of these islands 61 are provided according to contemplated conditions of utilization; use, as before, is made of the collecting grooves 41, 42 for return of lubricant to reservoir.

Figure 9 shows a slightly modified form in which the central island is split into two parts 63 and 64 within an intervening cross groove 65, thus insuring an even more complete ready distribution of the oil film under ordinary conditions and multiple restriction points at the bounds of the recesses for control of the building up of pressure and resistance to compression forces.

What is claimed is:

1 In a bearing construction, in combination, a bushing member having an opening therein, a journal member rotatably mounted in said opening, said opening being larger than said journal to form a clearance which provides resistance to flow therethrough of a film of fluid and to allow for relative radial movement of said members, a series of narrow separating grooves circumferentially disposed about the bearing surface of one of said members to divide said surface into a plurality of large substantially independent pressure film supporting land areas in opposed balanced relationship about said clearance, each of said land areas having at least twice the circumferential dimension of each of said grooves, a resistance connected to each groove, a pump driven independently of said members and having its delivery side connected to said resistances, and a pressure-relief valve connected to the delivery side of said pump, said pump and said valve with said grooves adapted to establish and maintain pressure films of flowing fluid throughout said land areas whether the bearing is in static or dynamic condition whereby the resistance to flow of fluid through said clearance and the pressure of said films on each of said land areas are differentiated upon radial relative movement of said members caused by external loads applied thereto to thereby automatically set up forces in the bearing to counteract said loads.

2. In a bearing construction, in combination, a bushing member having an opening therein, a journal member mounted in said opening, said opening being larger than said journal to form a clearance therebetween which provides resistance to flow therethrough of a film of viscous lubricant and to allow for relative radial movement of said members, said clearance being dimensioned to provide a prescribed flow resisting characteristic for the lubricant used, a series of narrow separating grooves circumferentially disposed about the bearing surface of one of said members to divide said surface into a plurality of substantially independent large pressure film supporting land areas in opposed balanced relationship about said clearance, each of said land areas having at least twice the circumferential dimension of each of said grooves, a resistance connected to each groove, a pump driven independently of said members and having its delivery side connected to said resistances, and a pressure relief valve connected to the delivery side of said pump, said pump and said valve being adjusted to a pressure prescribed by said flow resisting characteristic of said lubricant to thereby establish and maintain pressure films of said lubricant throughout said land areas whether the bearing is in static or dynamic condition whereby the resistance to flow of lubricant through said clearance and the pressure of said films on each of said land areas are differentiated upon radial relative movement of said members caused by external loads applied thereto thereby automatically setting up forces in the bearing to counteract said loads.

3. In a bearing construction, in combination, a bushing member having an opening therein, a journal member rotatably mounted in said opening, said opening being larger than said journal to form a clearance which provides resistance to flow therethrough of a film of fluid and to allow for relative radial movement of said members, means including a series of narrow separating grooves circumferentially disposed about the bearing surface of one of said members and collection chambers spaced from the opposite sides of said grooves to divide said surface into a plurality of substantially independent large pressure film supporting land areas in opposed balanced relationship about said clearance, each of said land areas having at least twice the circumferential dimension of each of said grooves, a resistance connected to each groove, a pump driven independently of said members and having its delivery side connected to said resistances, and a pressure relief valve connected to the delivery side of said pump, said pump and said valve with said grooves adapted to establish and maintain pressure films of flowing fluid throughout said land areas whether the bearing is in static or dynamic condition whereby the resistance to flow of fluid through said clearance and the pressure of said films on each of said land areas are differentiated upon radial relative movement of said members caused by external loads applied thereto to thereby automatically set up forces in the bearing to counteract said loads.

4. In a bearing construction, in combination, a bushing member having an opening therein, a journal member mounted in said opening, said opening being larger than said journal to form a clearance therebetween which provides resistance to flow therethrough of a film of fluid and to allow for relative radial movement of said members, a series of grooves circumferentially spaced about the bearing surface of one of said members and shaped to substantially surround island land areas bounded thereby, the remainder of said surface being divided by said island land areas to form a plurality of other independent pressure film supporting land areas, a resistance connected to each groove, a pump driven independently of said members and having its delivery side connected to said resistances, and a pressure relief valve connected to the delivery side of said pump, said pump and said valve with said grooves adapted to establish and maintain pressure films of flowing fluid over all of said land areas whether the bearing is in static or dynamic condition, the pressure of the film over said island land areas being substantially equal to the pressure in said grooves whereby the resistance to the flow of fluid through said space and the pressure of said films on each of said land areas are differentiated upon radial relative movement of said members caused by external loads applied thereto to thereby automatically set up forces in the bearing to counteract said loads.

5. In a bearing construction, in combination, a bushing member having an opening therein, a journal member mounted in said opening, said opening being larger than said journal to form a clearance therebetween which provides resistance to flow therethrough of a film of viscous lubricant and to allow for relative radial movement of said members, said clearance being dimensioned to provide a prescribed flow resisting characteristic for the lubricant used, a series of grooves circumferentially spaced about the bearing surface of one of said members and shaped to substantially surround island land areas bounded thereby, the remainder of said surface being divided by said island land areas to form a plurality of other independent pressure film supporting land areas, a resistance connected to each groove, a pump driven independently of said members and having its delivery side connected to said resistances, and a pressure relief valve connected to the delivery side of said pump, said pump and said valve being adjusted to a pressure prescribed by said flow resisting characteristic to establish and maintain pressure films of flowing lubricant over all of said land areas whether the bearing is in static or dynamic condition, the pressure of the film over said island land areas being substantially equal to the pressure in said grooves whereby the resistance to the flow of lubricant through said space and the pressure of said films on each of said land areas are differentiated upon radial relative movement of said members caused by external loads applied thereto to thereby automatically set up forces in the bearing to counteract said loads.

MARIO E. MARTELLOTTI.

REFERENCES CITED

The following references are of record in the file of this patent:

UNITED STATES PATENTS

| Number | Name | Date |
|---|---|---|
| 846,927 | Lasche | Mar. 12, 1907 |
| 1,999,266 | Warlop | Apr. 30, 1935 |
| 2,049,343 | Warren | July 28, 1936 |
| 2,062,250 | Moller | Nov. 24, 1936 |
| 2,349,690 | Arms | May 23, 1944 |

FOREIGN PATENTS

| Number | Country | Date |
|---|---|---|
| 244,539 | Italy | Jan. 30, 1926 |